US008773518B2

(12) United States Patent
Kato et al.

(10) Patent No.: US 8,773,518 B2
(45) Date of Patent: Jul. 8, 2014

(54) IMAGE DISPLAY APPARATUS AND IMAGE DISPLAY METHOD

(75) Inventors: Toshiyuki Kato, Osaka (JP); Hiroshi Mitani, Osaka (JP); Takahiro Kobayashi, Osaka (JP)

(73) Assignee: Panasonic Corporation, Osaka (JP)

( * ) Notice: Subject to any disclaimer, the term of this patent is extended or adjusted under 35 U.S.C. 154(b) by 314 days.

(21) Appl. No.: 12/919,704

(22) PCT Filed: Jan. 13, 2010

(86) PCT No.: PCT/JP2010/000137
§ 371 (c)(1),
(2), (4) Date: Aug. 26, 2010

(87) PCT Pub. No.: WO2010/082479
PCT Pub. Date: Jul. 22, 2010

(65) Prior Publication Data
US 2011/0032342 A1    Feb. 10, 2011

(30) Foreign Application Priority Data

Jan. 19, 2009  (JP) .................................. 2009-008885

(51) Int. Cl.
*H04N 13/04*   (2006.01)
*F21Y 105/00*  (2006.01)
(52) U.S. Cl.
CPC ....... *H04N 13/0418* (2013.01); *F21Y 2105/006* (2013.01); *F21Y 2105/008* (2013.01)
USPC ..................... 348/55; 348/56; 348/51; 348/43
(58) Field of Classification Search
CPC ..................... F21Y 2105/008; F21Y 2105/006
USPC ..................... 348/53, 52; 345/1–10
See application file for complete search history.

(56) References Cited

U.S. PATENT DOCUMENTS 5,128,692 A * 7/1992 Reisch ......................... 347/252
5,610,667 A * 3/1997 Hush ............................ 348/796
(Continued)

FOREIGN PATENT DOCUMENTS

JP    2001-154640    6/2001
JP    2003-066908    3/2003
(Continued)

OTHER PUBLICATIONS

Chen, C.-H., Chen, K.-H., Chen, C.-C., Chen, Y.-F. and Shieh, H.-P. D. (Jul. 2008), AMOLED panel driven by time-multiplexed clamped inverter circuit to reduce complex control signals. Journal of the Society for Information Display, 16: 787-791. doi: 10.1889/1.2953486.*
(Continued)

*Primary Examiner* — Sath V Perungavoor
*Assistant Examiner* — Matthew J Anderson
(74) *Attorney, Agent, or Firm* — Hamre, Schumann, Mueller & Larson, P.C.

(57) ABSTRACT

An image display method can make the total time of light emission longer per display line. This method is an image display method used in an image display apparatus that repeats displaying images for a left eye and for a right eye alternately that form a stereoscopic image, on a screen including a plurality of display lines, and includes: a shield switching starting step ($t_1$) of starting switching a shielding state of an eyewear; a write-scan starting step (210) of starting sequentially writing display data of the images in a plurality of display lines; and a light emission starting step (220) of starting continuous light emission from the plurality of display lines, based on the display data, and the write-scan starting step starts writing the display data, in a period ($S_c$) in which the shielding state is switched; the light emission starting step does not allow a plurality of display lines to continue light emission in the period ($S_c$) in which the shielding state is switched; and a time required for starting of continuous light emission from the plurality of display lines is shorter than a time required for write-scanning of the display data in the plurality of display lines.

5 Claims, 9 Drawing Sheets

(56) References Cited

U.S. PATENT DOCUMENTS

| | | | |
|---|---|---|---|
| 5,821,989 A * | 10/1998 | Lazzaro et al. | 348/56 |
| 6,088,052 A * | 7/2000 | Guralnick | 348/51 |
| 6,122,000 A * | 9/2000 | Yee et al. | 348/51 |
| 6,295,065 B1 * | 9/2001 | Tettington | 345/419 |
| 6,348,916 B1 * | 2/2002 | Jeong et al. | 345/213 |
| 6,456,432 B1 * | 9/2002 | Lazzaro et al. | 359/464 |
| 6,727,867 B2 * | 4/2004 | Divelbiss et al. | 345/7 |
| 6,872,974 B2 * | 3/2005 | Andry et al. | 257/59 |
| 7,071,932 B2 * | 7/2006 | Libsch et al. | 345/211 |
| 7,180,554 B2 * | 2/2007 | Divelbiss et al. | 348/742 |
| 7,430,018 B1 * | 9/2008 | Patel | 348/588 |
| 8,149,185 B2 * | 4/2012 | Uchino et al. | 345/76 |
| 8,264,451 B2 * | 9/2012 | Kimura | 345/102 |
| 8,497,885 B2 * | 7/2013 | Ikeda et al. | 345/690 |
| 8,610,650 B2 * | 12/2013 | Somerville | 345/82 |
| 2002/0153844 A1 | 10/2002 | Koyama | |
| 2003/0067424 A1 | 4/2003 | Akimoto et al. | |
| 2006/0119552 A1 * | 6/2006 | Yumoto | 345/76 |
| 2006/0221015 A1 | 10/2006 | Shirasaki et al. | |
| 2007/0079191 A1 * | 4/2007 | Shin | 714/726 |
| 2007/0195408 A1 * | 8/2007 | Divelbiss et al. | 359/462 |
| 2007/0229395 A1 | 10/2007 | Slavenburg et al. | |
| 2007/0229487 A1 | 10/2007 | Slavenburg et al. | |
| 2009/0027588 A1 * | 1/2009 | Medendorp et al. | 349/62 |
| 2009/0051759 A1 * | 2/2009 | Adkins et al. | 348/53 |
| 2009/0201286 A1 * | 8/2009 | Hasegawa et al. | 345/214 |

FOREIGN PATENT DOCUMENTS

| | | |
|---|---|---|
| JP | 62-061493 | 3/2007 |
| JP | 2009-531979 | 9/2009 |
| WO | 2007/126904 | 11/2007 |
| WO | WO 2009010500 A1 * | 1/2009 |

OTHER PUBLICATIONS

Ishikawa, Hiroki and Murai, Yoshihiro. "A Novel Soft-Switched PWM Current Source Inverter with Voltage Clamped Circuit". IEEE Transactions on Power Electronics. vol. 15, No. 6 (Nov. 2000).*

* cited by examiner

IMAGE DISPLAY APPARATUS AND IMAGE DISPLAY METHOD

TECHNICAL FIELD

The present invention relates to an image display apparatus that displays images by switching the images, such as stereoscopic image display apparatuses of the time-division shutter scheme, and an image display method used in this image display apparatus.

BACKGROUND ART

Stereoscopic image display apparatuses of the time-division shutter scheme, as it is called, are widely spread in various fields including medical treatment and amusement. The stereoscopic image display apparatus displays images by alternately switching between images for the right eye and images for the left eye. A user can watch stereoscopic images by using a shutter eyewear and watching images of the stereoscopic image display apparatus. Here, "shutter eyewear" refers to an eyewear having a shielding mechanism (hereinafter "shutters") for alternately shielding the views of the left and right eyes in synchronization with switching of image display.

However, it takes a certain period of time to switch the open/closed state of the shutters (hereinafter "shutter switching"). In a period in which switching between the shutters is started and is finished (hereinafter "period of shutter switching"), light is allowed to be incident on both eyes. In this period of shutter switching, if the right-eye image is displayed, the right-eye image also enters the left eye, and, if the left-eye image is displayed, the left-eye image also enters the right eye. That is, the cross-talk between the right-eye image and the left-eye image occurs, and therefore it is not possible to display quality stereoscopic images.

Then, for example, Patent Literature 1 discloses a technique of preventing cross-talk between right-eye images and left-eye images.

FIG. 1 is an operation timing chart of a stereoscopic image display apparatus disclosed in Patent Literature 1. FIG. 1A shows the start timing and the end timing of a light emitting operation (hereinafter simply "light emission") based on display data of each display line. FIG. 1B shows the open/closed state of a right-eye shutter at each timing. FIG. 1C shows the open/closed state of a left-eye shutter at each timing.

The panel of the stereoscopic image display apparatus is formed with, for example, 1080 display lines aligned in the vertical direction and in parallel to each other. Each display line is formed with, for example, a plurality of pixels aligned linearly in the horizontal direction. As shown in FIG. 1A, the stereoscopic image display apparatus sequentially performs write-scanning per display line of display data. Then, the stereoscopic image display apparatus starts light emission from each display line immediately after display data is written in each display line, and stops light emission from each display line after a certain period of time passes.

At first time $t_1$ when light emission from all display lines is stopped completely, the stereoscopic image display apparatus outputs, to the shutter eyewear, a control signal for commanding to switch the right-eye shutter from the transmitting state to the shielding state, and switches the left-eye shutter from the shielding state to the transmitting state. At second time $t_2$ when switching between the shutters of the shutter eyewear is finished, the stereoscopic image display apparatus starts write-scanning display data of the next left-eye image and emitting light. Hence, in period $S_c$ of shutter switching between first time $t_1$ and second time $t_2$, images are not displayed.

Then, at third time $t_3$ when light emission from all display lines is stopped completely, the stereoscopic image display apparatus outputs a control signal for commanding to switch the left-eye shutter from the transmitting state to the shielding state, and switch the right-eye shutter from the shielding state to the transmitting state. Then, at fourth time $t_4$ after period $S_c$ of shutter switching, the stereoscopic image display apparatus starts write-scanning display data of a right-eye image and emitting light.

According to this operation, it is possible to provide periods of light emission for right-eye images, periods of light emission for left-eye images and periods $S_c$ of shutter switching not to overlap in the time domain, and prevent cross-talk between the right-eye images and the left-eye images.

CITATION LIST

Patent Literature

PTL 1: Japanese Patent Application Laid-Open No. SHO62-61493
PTL 2: Japanese Patent Application Laid-Open No. 2003-66908

SUMMARY OF INVENTION

Technical Problem

However, the stereoscopic image display apparatus disclosed in Patent Literature 1 has a problem of having difficulty in displaying bright images. The reason is as follows.

To perform a write-scan of and start light emission from all display lines, predetermined time $T_{on}$ is required in association with display data. Further, principally, the duration of light emission from each display line is equal, and therefore virtually the same duration of predetermined time $T_{off}$ is required to stop light emission from all display lines. Therefore, maximum duration $T_d$ of light emission per display line is represented by following equation 1 according to the relationship between frame cycle f for displaying the right-eye image and the left-eye image forming one frame, and period $S_c$ of shutter switching.

$$T_d = f/2 - S_c - T_{on} \quad \text{(Equation 1)}$$

That is, the maximum duration of light emission for each of the right eye and left eye in one frame, can only be secured within the range subtracting, from half of frame cycle f, period $S_c$ of shutter switching and time $T_{on}$ required to perform a write-scan of and start light emission from all display lines. Further, in order to prevent images from being seen by making them blink, frame cycle f cannot be made much longer.

As a method of making images brighter, there are a method of making the total time of light emission longer and a method of increasing the brightness of each pixel upon light emission. However, the stereoscopic image display apparatus disclosed in Patent Literature 1 cannot make the total time of light emission longer than a value represented by above equation 1, and therefore must increase the brightness of each pixel in order to further increase the brightness of images. However, if the brightness of pixels is increased, there is a problem that electrical load increases and batteries of light emitting elements decrease.

Thus, it is preferable to make the total time of light emission longer to have brighter images.

It is therefore an object of the present invention to provide an image display apparatus and an image display method for making the total time of light emission longer per display line.

Solution to Problem

The image display apparatus according to the present invention that repeats displaying images for a left eye and for a right eye alternately that form a stereoscopic image, on a screen including a plurality of display lines, includes: a write-scanning section that sequentially writes display data of the images in the plurality of display lines; a light emitting section that allows the plurality of display lines to continue light emission, based on the written display data; a light emission timing controlling section that controls a timing to start continuous light emission from the plurality of display lines; and a shield timing controlling section that controls a timing to switch a shielding state of an eyewear which can shield views of the left and right eyes alternately, and the write-scanning section writes the display data of the images in at least part of the plurality of display lines, in a period in which the shielding state of the eyewear is switched; the light emission timing controlling section controls the timing to start continuous light emission from the plurality of display lines without allowing the plurality of display lines to continue light emission in the period in which the shielding state of the eyewear is switched; and a time required for starting of continuous light emission from the plurality of display lines is shorter than a time required for write-scanning of the display data in the plurality of display lines.

The image display method according to the present invention used in an image display apparatus that repeats displaying images for a left eye and for a right eye alternately that form a stereoscopic image, on a screen including a plurality of display lines, includes: a shield switching starting step of starting switching a shielding state of an eyewear that can shield views of the left and right eyes alternately; a write-scan starting step of starting sequentially writing display data of the images in the plurality of display lines; and a light emission starting step of starting continuous light emission from the plurality of display lines, based on the written display data, and the write-scan starting step starts writing the display data of the images in at least part of the plurality of display lines, in a period in which the shielding state of the eyewear is switched; the light emission starting step starts continuous light emission from the plurality of display lines without allowing the plurality of display lines to continue light emission in the period in which the shielding state of the eyewear is switched; and a time required for starting of continuous light emission from the plurality of display lines is shorter than a time required for write-scanning of the display data in the plurality of display lines.

Advantageous Effects of Invention

According to the present invention, it is possible to allocate the time reducing the time required to start light emission from all display lines, to the time of light emission per display line, and make the total time of light emission longer per display line.

DESCRIPTION OF EMBODIMENTS

Hereinafter, embodiments of the present invention will be explained in detail with reference to the accompanying drawings.

Embodiment 1

Embodiment 1 of the present invention is an example where the present invention is applied to a stereoscopic image display apparatus that is used together with the shutter eyewear for alternately shielding the views of left and right eyes in synchronization with switching of image display, and that uses organic EL (electroluminescence) elements as light emitting elements.

Figure 1:
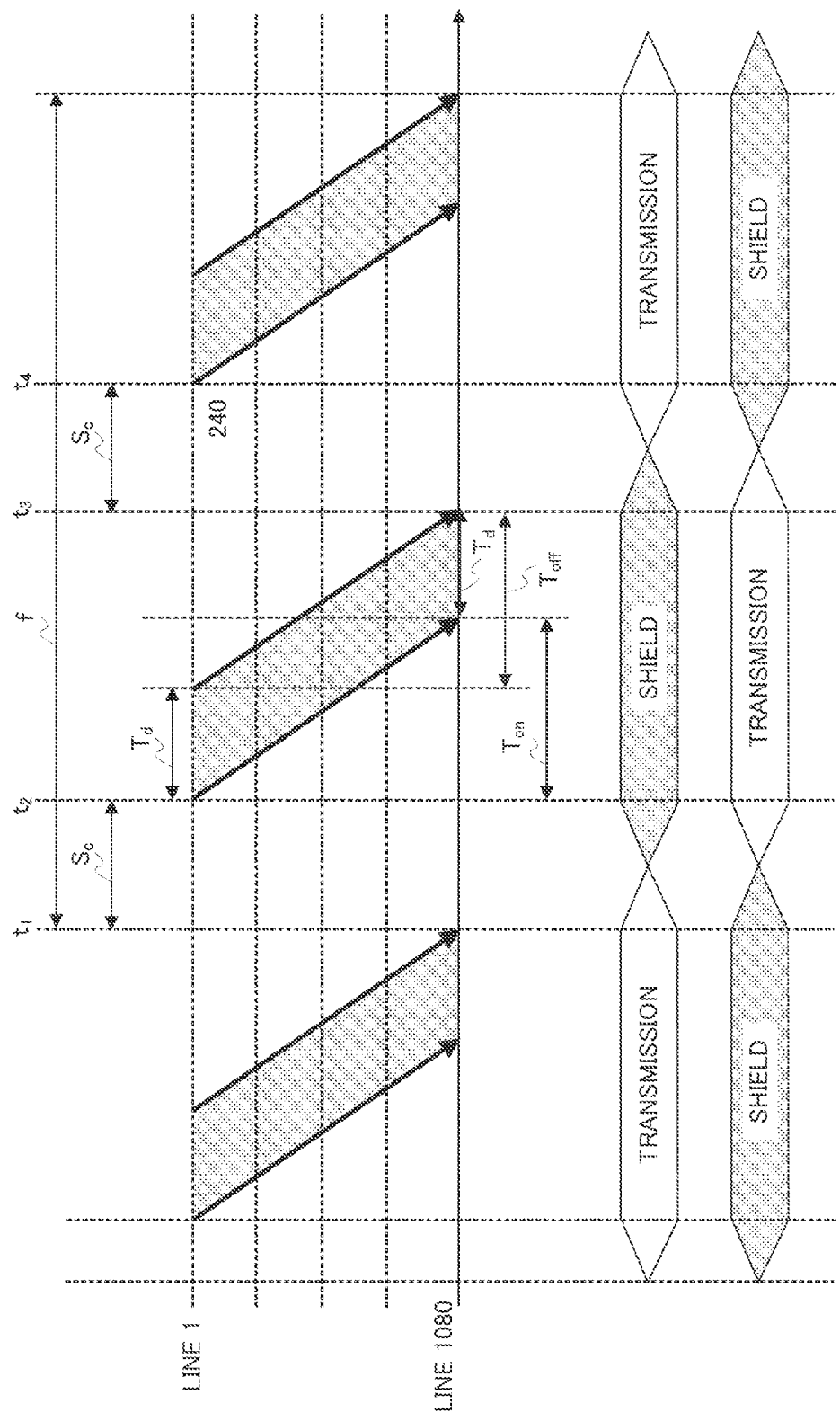
FIG. 1 is an operation timing chart of a conventional image display apparatus.
Figure 2:
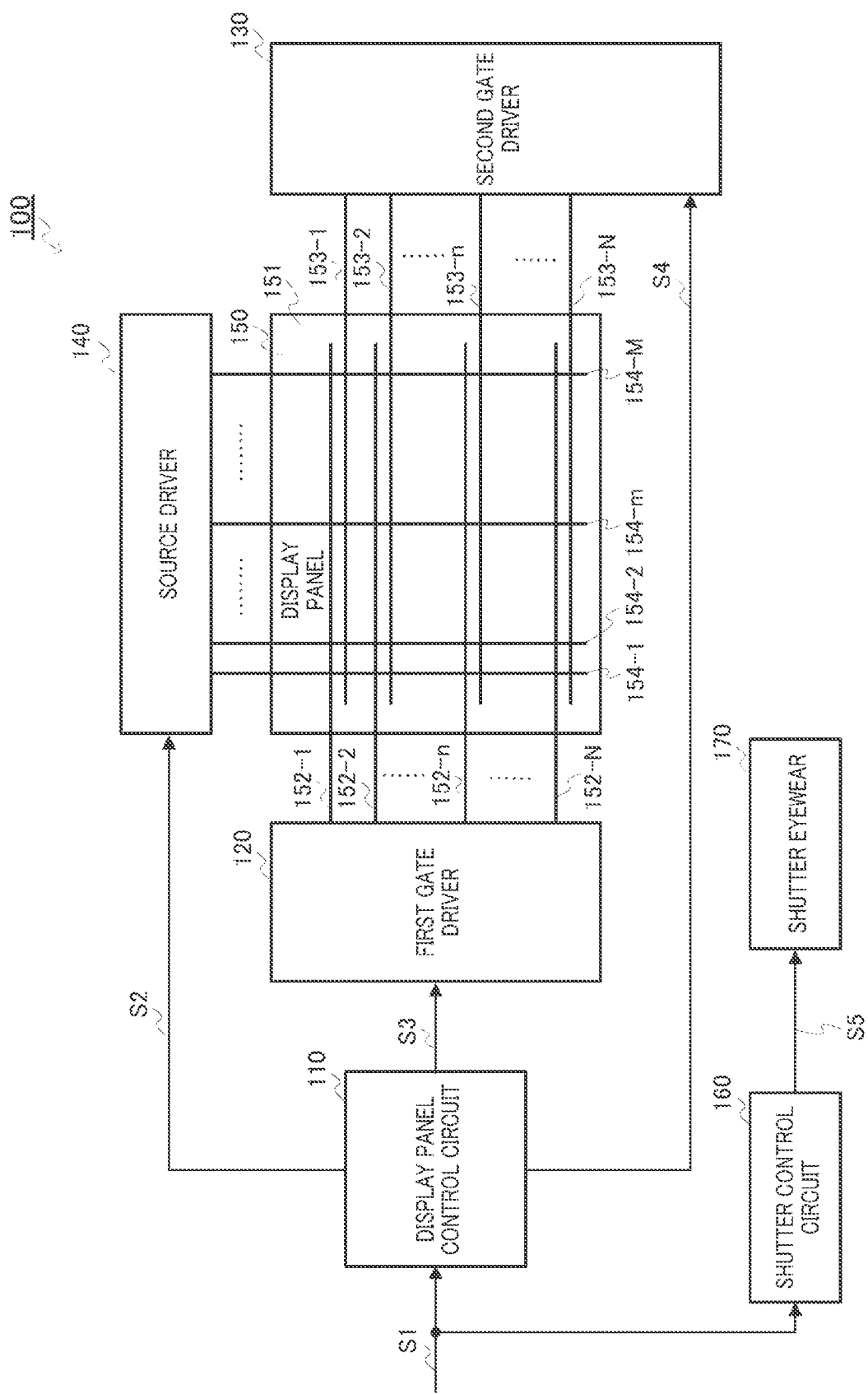
FIG. 2 is a block diagram showing an example of a configuration of an image display apparatus according to Embodiment 1 of the present invention.

FIG. 2 is a block diagram showing a configuration of an image display apparatus according to Embodiment 1 of the present invention.

In FIG. 2, image display apparatus 100 has display panel control circuit 110, first gate driver 120, second gate driver 130, source driver 140, display panel 150, shutter control circuit 160 and shutter eyewear 170.

Display panel 150 is an organic EL panel, and has display area 151 as the display screen. Further, display panel 150 has N write lines 152-1, 152-2, ... and 152-N (for example, N=1080) and N light emission control lines 153-1, 153-2, ... and 153-N that are arranged in parallel. Further, display panel 150 has M source signal lines 154-1, 154-2, ... and 154-M that are arranged orthogonal to these write lines 152 and light emission control lines 153. Further, display panel 150 has an organic EL pixel circuit (not shown) formed with a thin film transistor and an organic EL pixel element, in each intersection of write lines 152 and light emission control lines 153. Hereinafter, a group of organic EL pixel circuits associated with same write line 152 are referred to as "display line" where necessary. That is, display panel 150 is formed by arranging M display lines each including N organic EL elements.

Display panel control circuit 110 generates source driver control signal S2 based on display data signal S1, and outputs generated source driver control signal S2 to source driver 140. Further, display panel control circuit 110 generates first gate driver control signal S3 and second gate driver control signal S4 based on the input synchronizing signal. Then, display panel control circuit 110 outputs generated first gate driver control signal S3 to first gate driver 120, and outputs generated second gate driver control signal S4 to second gate driver 130.

Display data signal S1 includes an image signal, a vertical synchronizing signal and a horizontal synchronizing signal. An image signal refers to a signal for specifying each pixel value of the left-eye image and each pixel value of the right-eye image per frame. A vertical synchronizing signal refers to a signal for synchronizing timings for processing in the vertical direction of the screen, and, here, refers to a reference signal for processing timings of the left-eye image and the right-eye image of each frame. A horizontal synchronizing signal refers to a signal for synchronizing timings for processing in the horizontal direction of the screen, and, here, refers to a reference signal for a processing timing of each display line.

First gate driver control signal S3 and second gate driver control signal S4 each include a vertical synchronizing signal and a horizontal synchronizing signal. Source driver control signal S2 includes an image signal and a horizontal synchronizing signal.

Source driver 140 drives source signal lines 154-1 to 154-M of display panel 150 based on source driver control signal S2. To be more specific, source driver 140 controls the source signal received as input in each organic EL pixel circuit, based on the image signal and the horizontal synchronizing signal.

First gate driver 120 is a write-scanning section of display panel 150, and drives write lines 152-1 to 152-N of display panel 150 based on first gate driver control signal S3. To be more specific, first gate driver 120 controls a write signal received as input in each organic EL pixel circuit, per at least display line based on a vertical synchronizing signal and a horizontal synchronizing signal.

Second gate driver 130 is a light emission control scanning section of display panel 150, and drives light emission control lines 153-1 to 153-N of display panel 150 based on second gate driver control signal S4. To be more specific, second gate driver 130 controls a light emission control signal received as input in each organic EL pixel circuit, per at least display line based on the vertical synchronizing signal and horizontal synchronizing signal.

Above display panel control circuit 110 performs signal control such that second gate driver 130 performs scanning to switch off light emission control line 153-$n$ (where n is an integer from 1 to N), and then first gate driver 120 write-scans write line 152-$n$. Then, display panel control circuit 110 performs signal control such that, after write line 152-$n$ is write-scanned, second gate driver 130 performs scanning to switch on light emission control line 153-$n$. By this means, images based on input image signals are displayed on display area 151 of display panel 150.

Shutter control circuit 160 generates shutter control signal S5 based on display data signal S1. Shutter control signal S5 refers to a signal for commanding shutter eyewear 170 to switch between the shutters. Then, shutter control circuit 160 transmits generated shutter control signal S5 to shutter eyewear 170 by, for example, infrared communication.

Shutter eyewear 170 refers to, for example, an eyewear in which liquid crystal shutters are arranged in the lens portions for the both eyes. That is, shutter eyewear 170 switches the shielding state between the left and right lenses according to shutter control signal S5, and inputs images displayed by display panel 150, to the left and right eyes alternately.

Further, image display apparatus 100 has a CPU (central processing unit), a storing medium such as a ROM (read only memory) that stores a control program, a working memory such as a RAM (random access memory) and a communication circuit although these are not shown. That is, display data signal S1 is generated when, for example, the CPU executes the control program. Further, source driver 140, first gate driver 120, second gate driver 130 and shutter control circuit 160 are elements forming, for example, a current program circuit, voltage program circuit, or a clamped inverter circuit.

Figure 3:
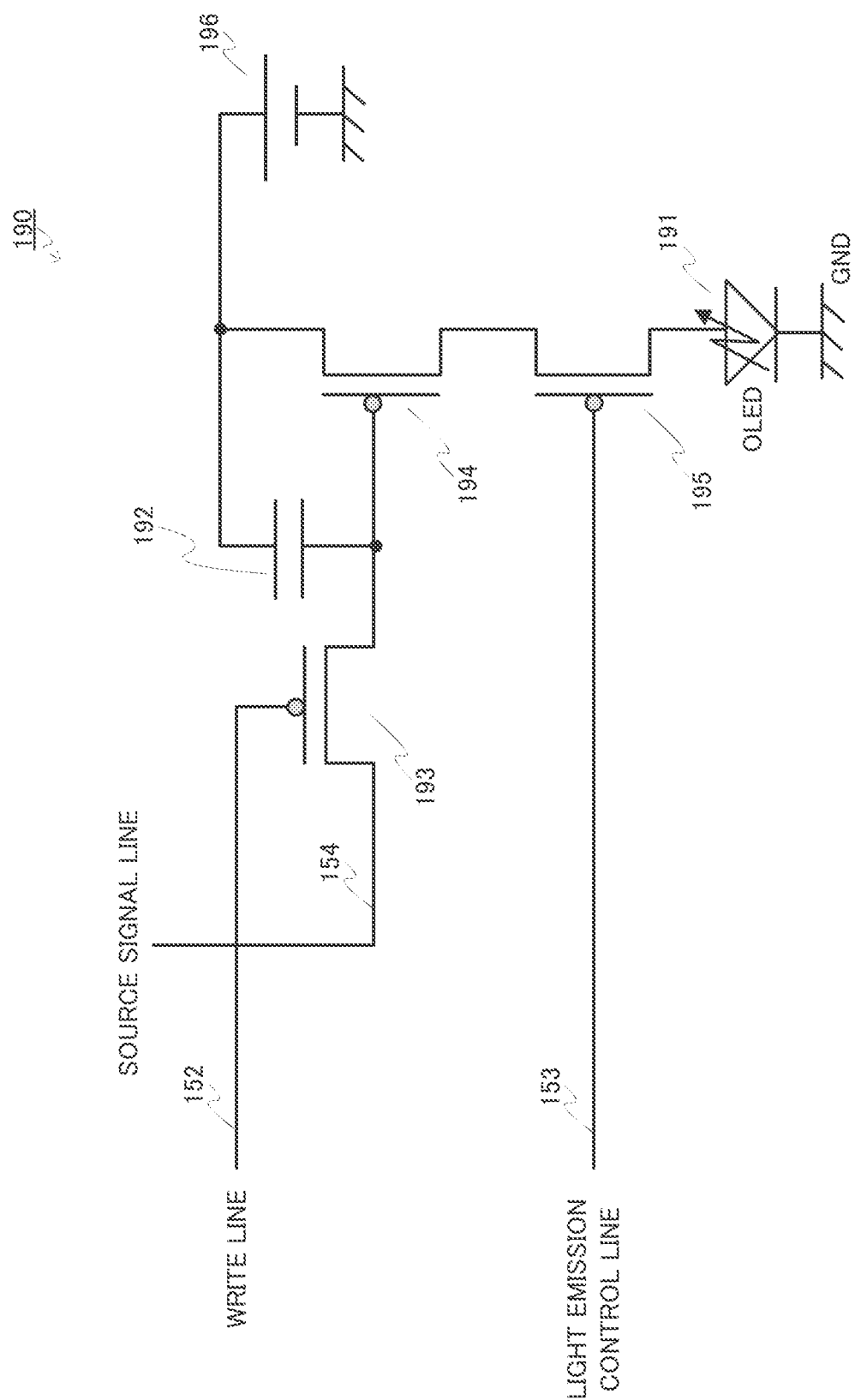
FIG. 3 is a circuit diagram showing an example of a configuration of an organic EL pixel circuit according to Embodiment 1.

FIG. 3 is a circuit diagram showing an example of an organic EL pixel circuit arranged in image display apparatus 100.

In FIG. 3, organic EL pixel circuit 190 has organic EL element 191 (i.e. organic light emitting diode ("OLED")), memory 192, data write transistor 193, gradation control transistor 194 and light emission control transistor 195.

Data write transistor 193 writes the potential of the source signal from source signal line 154, into memory 192 connected to voltage source 196 according to the write signal from write line 152. Gradation control transistor 194 drives organic EL element 191 according to the potential of memory 192. Light emission control transistor 195 is arranged between gradation control transistor 194 and organic EL element 191, and performs a switching operation of driving of organic EL element 191 upon receiving the light emission control signal from light emission control line 153.

Organic EL pixel circuit 190 employing this configuration sets the gradation upon light emission from organic EL element 191, based on a scan according to the source signal and the write signal (i.e. a scan of a write line). Further, organic EL pixel circuit 190 sets the period of light emission from organic EL element 191 based on the light emission control signal. That is, organic EL pixel circuit 190 can separately execute the process of setting gradation upon light emission from organic EL element 191, and the process of setting the period of light emission from organic EL element 191.

That is, organic EL pixel circuit 190 can provide, for each display line, a time lag between the end timing of a write-scan of an image signal (hereinafter "display data" where necessary), which is a corresponding portion of an image, and the start timing of light emission. Note that a similar organic EL pixel element is disclosed in, for example, Patent Literature 2.

Image display apparatus 100 that has these organic EL pixel circuits 190 can control per display line the time lag (hereinafter "light emission time lag") from the end of a write-scan of display data, to the start of light emission. For example, it is possible to set light emission time lags of different durations per display line.

In case where the light emission time lag is not particularly provided or in case where light emission time lags of all display lines are made equal, the total time of light emission for the left and right eyes can only be secured within the same range as in above Patent Literature 1.

Hence, image display apparatus 100 according to the present embodiment controls the light emission time lag so as to make the time required to start light emission shorter than the write-scan time. Then, the time reducing the time required to start light emission is allocated to the duration of light emission per display line. Note that the time required to start light emission refers to the time required to start tight emission from all display lines, and the write-scan time refers to the time required to write display data in all display lines.

To be more specific, with the present embodiment, image display apparatus 100 starts light emission from all display lines simultaneously when write-scanning all display lines is finished.

Further, by performing write-scanning utilizing at maximum the period of shutter switching, light is emitted utilizing at maximum the periods other than the periods of shutter switching.

To be more specific, with the present embodiment, image display apparatus 100 starts a write-scan when the period of shutter switching starts, starts light emission as soon as possible after the period of shutter switching ends, and continues light emission until the next period of shutter switching starts.

An example of the operation of image display apparatus 100 when the time of light emission lag is controlled as described above will be explained.

Figure 4:
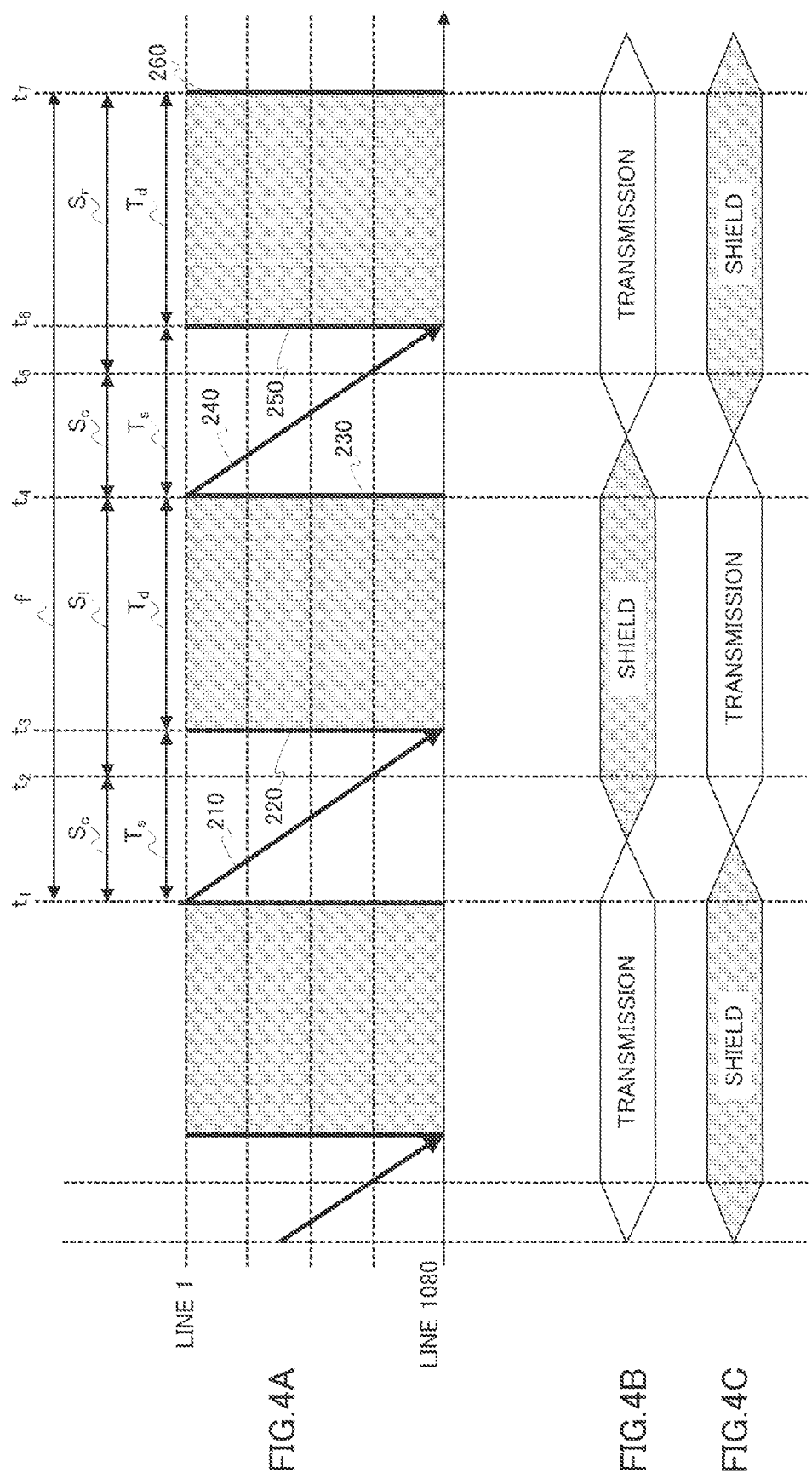
FIG. 4 is a first operation timing chart of an image display apparatus according to Embodiment 1.

FIG. 4 is an operation timing chart of image display apparatus 100 according to the present embodiment. FIG. 4A shows the start timing and the end timing of light emission from each display line. FIG. 4B shows the open/closed state of the right-eye shutter at each timing. FIG. 4C shows the open/closed state of the left-eye shutter at each timing.

As shown in FIG. 4B and FIG. 4C, from time $t_1$, image display apparatus 100 makes the shutter eyewear switch the right-eye shutter from the transmitting state to the shielding state, and switch the left-eye shutter from the shielding state to the transmitting state.

By contrast with this, as shown in FIG. 4A, at the same time when period $S_c$ of shutter switching starts at first time $t_1$, image display apparatus 100 starts writing display data in the first display line, and, as shown by line 210, write-scans display data of the left-eye image, in a plurality of display lines. At this time, assume that image display apparatus 100 still stops light emission from all display lines.

In case where write-scan time $T_s$ is longer than period $S_c$ of shutter switching, second time $t_2$ when period $S_c$ of shutter switching ends comes before third time $t_3$ when write-scan time $T_s$ ends. In this case, as shown by line 220, image display apparatus 100 starts light emission from all display lines simultaneously, at third time $t_3$ of period $S_l$ in which the left-eye image can be displayed. By this means, the left-eye image is displayed in a state where only the left-eye shutter of shutter eyewear 170 allows light to transmit. Note that, in case where write-scan time $T_s$ is shorter than period $S_c$ of shutter switching, image display apparatus 100 starts light emission from display lines after second time $t_2$ when switching between the shutters is finished.

Then, image display apparatus 100 makes the shutter eyewear start switching between its shutters again from fourth time $t_4$. To be more specific, image display apparatus 100 switches the left-eye shutter from the transmitting state to the shielding state, and switches the right-eye shutter from the shielding state to the transmitting state.

By contrast with this, as shown by line 230, image display apparatus 100 stops light emission from all display lines at fourth time $t_4$ when period $S_c$ of shutter switching starts again, and, as shown by line 240, write-scans display data of the right-eye image.

Next, as shown by line 250, image display apparatus 100 starts light emission from all display lines simultaneously, at sixth time $t_6$ of period $S_r$ in which the right-eye image can be displayed, and, as shown by line 260, further stops light emission from all display lines, at seventh time $t_7$ when next period $S_c$ of shutter switching starts. By this means, the right-eye image is displayed in the state where only the right-eye shutter of shutter eyewear 170 allows light to transmit. Image display apparatus 100 repeats switching between the shutters, write-scanning and light emission as described below.

As a result, between the user's both eyes, the state in which the left-eye image is incident only on the left eye and the state in which the right-eye image is incident only on the right eye are switched alternately in frame cycle f that is short to an extent that switching is not recognized.

For example, frame cycle f in which the right-eye image and the left-eye image forming one frame are displayed is 16 ms (milliseconds), period $S_c$ of shutter switching is 2 ms and period $S_l$ in which the left-eye image can be displayed and period $S_r$ in which the right-eye image can be displayed are each 6 ms. In this short frame cycle f, the switching between image display and non-image display, and the switching between images are not visually seen. Consequently, according to the operation, stereoscopic images are displayed.

Further, maximum durations $T_d$ of light emission of the left-eye image and the right-eye image per display line are represented by following equation 2.

$$T_d = f/2 - T_s \quad \text{(Equation 2)}$$

That is, as the total time of light emission for each of the left and right eyes in one frame, it is possible to secure the time subtracting write-scan time $T_s$ from half of frame cycle f.

Duration $T_d$ of light emission is $(S_c + T_{on}) - T_s$ longer than equation 1 in a conventional technique. Further, time $T_{on}$ required to perform a write-scan of and start light emission from all display lines in the conventional technique, and write-scan time $T_s$ in the present embodiment are virtually equal. Consequently, according to the present invention, duration $T_d$ of light emission cannot be made period $S_c$ of shutter switching longer than the conventional technique, and the total time of light emission cannot be made much longer.

Note that, if write-scan time $T_s$ is shorter than period $S_c$ of shutter switching, maximum durations $T_d$ of light emission for the left-eye image and the right-eye image per display line are represented by following equation 3.

$$T_d = f/2 - S_c \quad \text{(Equation 3)}$$

Next, an example of details of signal control for realizing the operation shown in FIG. 4 will be explained.

Image display apparatus 100 inputs image signals for displaying stereoscopic images, to source driver 140. Further, image display apparatus 100 inputs vertical synchronizing signals to first gate driver 120, second gate driver 130 and shutter control circuit 160. Furthermore, image display apparatus 100 inputs horizontal synchronizing signals to first gate driver 120, source driver 140 and second gate driver 130. Here, explanation will be made assuming that vertical synchronizing signals are outputted at first time $t_1$ and fourth time $t_4$.

Upon receiving a vertical synchronizing signal as input, shutter control circuit 160 transmits shutter control signal S5 for commanding switching between the shutters, to shutter eye wear 170. By this means, shutter switching of shutter eyewear 170 is started at first time $t_1$. Note that, in case where the right-eye image is displayed next based on an image signal, shutter control circuit 160 preferably outputs the shutter control signal for switching the right-eye shutter to the transmitting state. Further, in case where the left-eye image is displayed next, shutter control circuit 160 preferably outputs a shutter control signal for switching the left-eye shutter to the transmitting state.

Upon receiving horizontal synchronizing signals as input, source driver 140 outputs source signals based on the image signals, sequentially to organic EL pixel circuits 190. Further, upon receiving vertical synchronizing signals as input, first gate driver 120 starts counting the number of horizontal synchronizing signals, and switches on write signals sequentially for the same number of organic EL pixel circuits 190 as the count value. By this means, from first time $t_1$ to third time $t_3$, a write-scan of display data is performed in all display lines.

By contrast with this, upon receiving the vertical synchronizing signals as input, second gate driver 130 starts counting the number of horizontal synchronizing signals. Then, after the count value reaches the number of display lines and a sufficient time to finish writing display data in the last display line passes, second gate driver 130 switches on light emission control signals for all display lines simultaneously. That is, if writing display data in all display lines is finished, second gate driver 130 switches on light emission signals for all display lines simultaneously. By this means, at third time $t_3$, all display lines start emitting light simultaneously.

Then, when a vertical synchronizing signal is received as input again, a shutter control signal, a source signal and a write signal are controlled in the same way. By contrast with this, before shutter switching is started again according to the shutter control signal, second gate driver 130 switches off light emission control signals for all display lines simultaneously. By this means, at fourth time $t_4$, light emission from all display lines is stopped, and switching between the shutters and a write-scan of display data are started.

Note that the timing to switch off light emission control signals may be based on the timing vertical synchronizing signals are received as input, or may be based on the timing light emission control signals are switched on immediately before. Here, the light emission control signals need to be controlled such that duration $T_d$ of light emission becomes adequate in association with the desired brightness.

According to this signal control, at the timing (for example, at third time $t_3$ and sixth time $t_6$) write-scanning the display line (here, line 1080) that was write-scanned finally, is finished, image display apparatus 100 can start light emission from all display lines simultaneously. Further, image display apparatus 100 can start write-scanning at the same time when the period of shutter switching starts, start emitting light in image display periods, and continue emitting light until the next period of shutter switching starts.

As explained above, according to the present embodiment, it is possible to control a scan of write lines and light emission individually and simultaneously, and start light emission from all display lines simultaneously even though the timings to finish write-scanning do not match. Further, light emission from all display lines is started simultaneously, so that it is possible to reduce the time required to start light emission from all display lines and allocate the time matching the reduction, to the time of light emission of each display line. By this means, it is possible to secure a longer total time of light emission occupying a frame, and display bright stereoscopic images. That is, it is possible to provide a stereoscopic image display apparatus of the time-division shutter scheme that is reliable in the long term and provides bright images.

Note that, although the timing to start light emission is preferably as soon as possible after write-scanning all display lines is finished, this timing does not always need to match with the end of a write-scan of all display lines. Further, although the timing to stop light emission is preferably as late as possible before the period of shutter switching starts, this timing does not always need to coincide with the start of the period of shutter switching.

Figure 5:
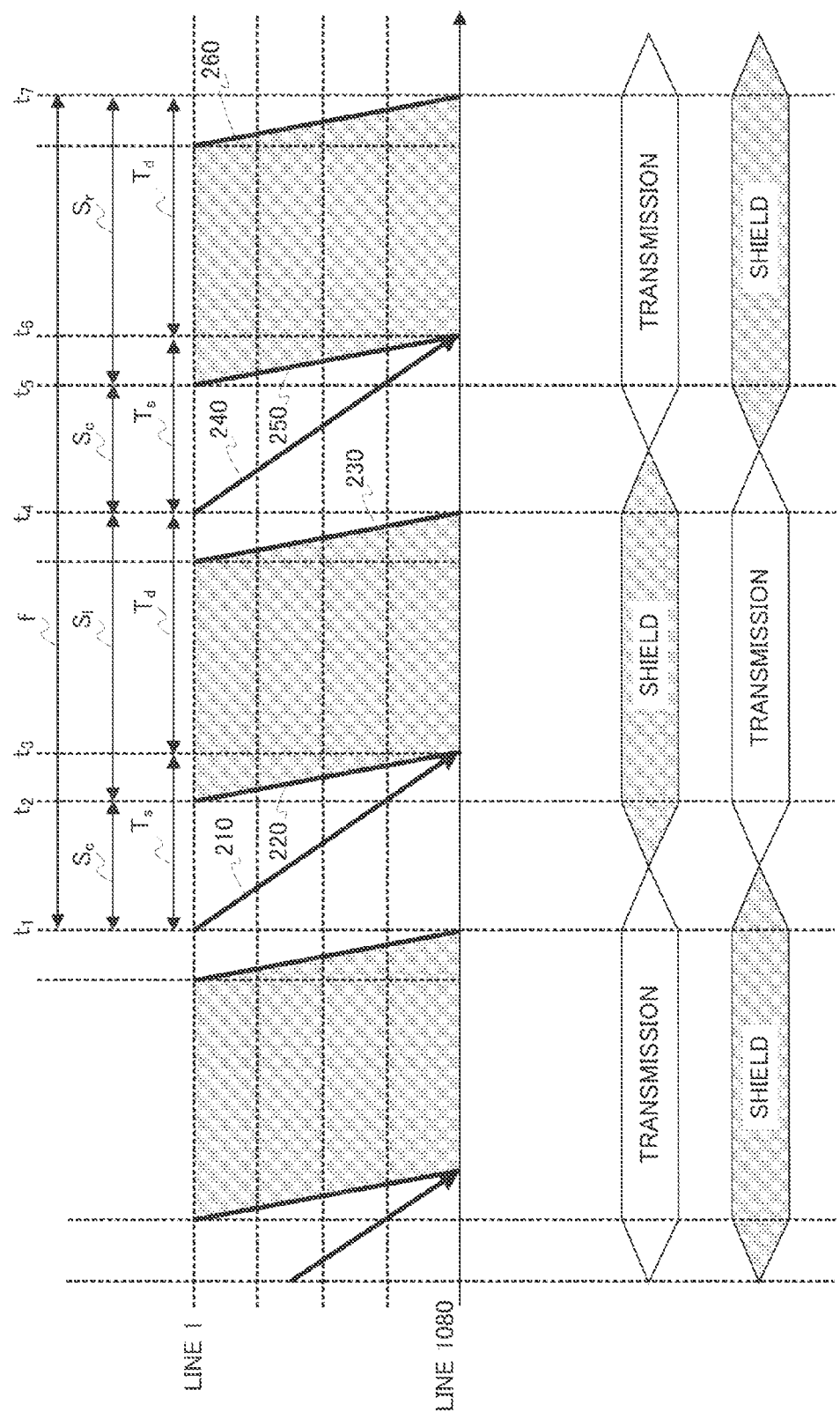
FIG. 5 is a second operation timing chart of an image display apparatus according to Embodiment 1.

FIG. 5 is an example of an operation timing chart in case where the timing to start light emission and the timing to finish a write-scan of all display lines do not match.

As shown in FIG. 5, with this example, from second time $t_2$ when period $S_c$ of shutter switching ends before third time $t_3$ when write-scan time $T_s$ ends, image display apparatus 100 starts light emission from display lines that has been write-scanned completely. In order to realize this operation, it is only necessary to determine in advance the delay time from the time when write-scanning each display line is finished to the time when light emission is started, based on, for example, the duration of the period of shutter switching and a write-scan time, and set the delay time based on the determined delay time, to second gate driver 130.

Even in this case, as shown in FIG. 5, if the time required to start light emission is shorter than a write-scan time, it is possible to secure a longer total time of light emission compared to a conventional technique, and display bright stereoscopic images. That is, it is possible to provide a stereoscopic image display apparatus of the time-division shutter scheme that is reliable in the long term and provides bright images.

Embodiment 2

Embodiment 2 of the present invention is an example where periods of light emission from part of display lines are shifted in the time domain.

In case where periods of light emission from all display lines are matched as shown in FIG. 4 of Embodiment 1, power for all display lines is required in these periods of light emission and therefore power load increases. By contrast with this, in case where a write-scan time is longer than a period of shutter switching, it is possible to shift periods of light emission from part of display lines in the time domain without reducing the total time of light emission. Hence, with the present embodiment, power load is reduced by shifting periods of light emission from part of display lines in the time domain.

Figure 6:
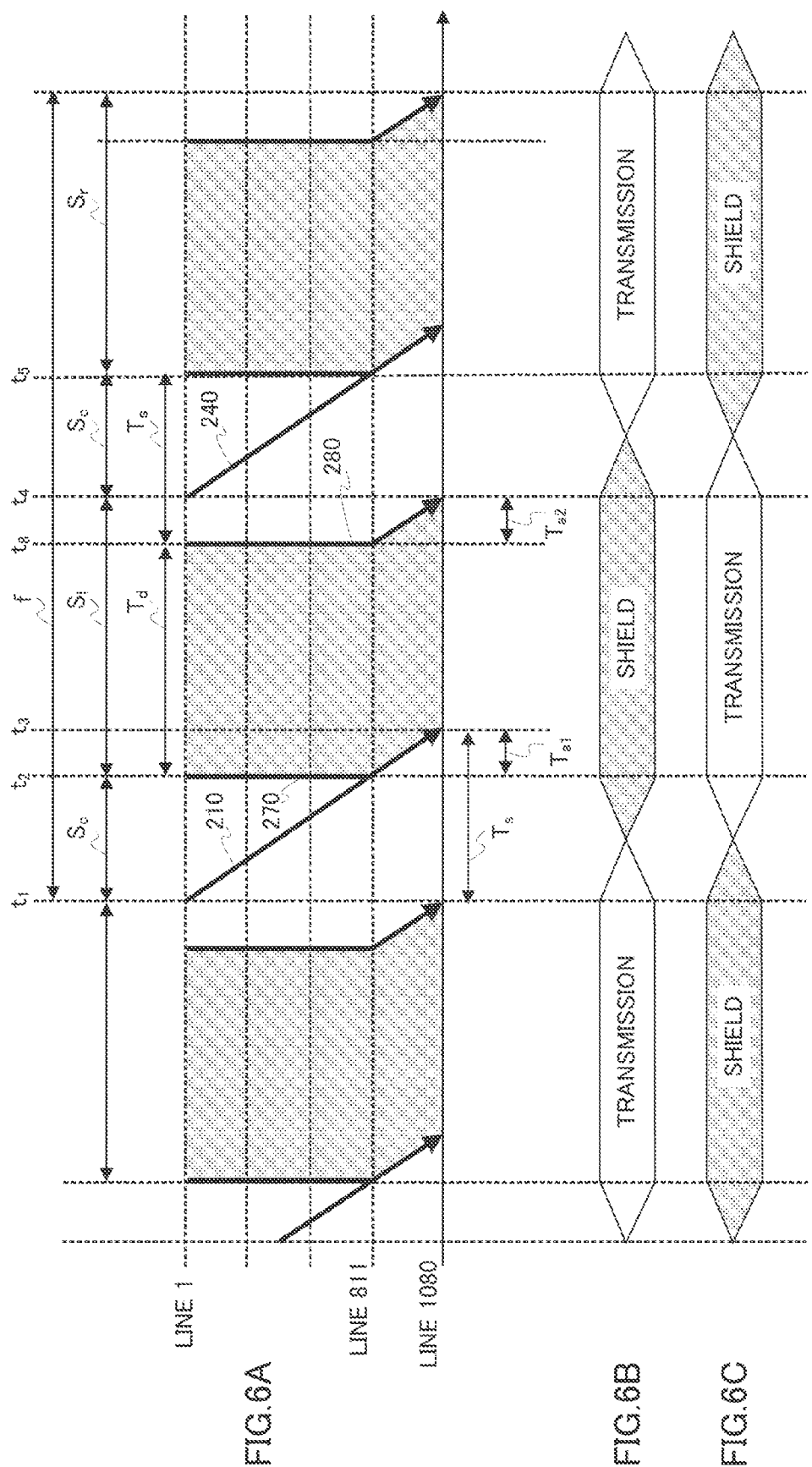
FIG. 6 is an operation timing chart of an image display apparatus according to Embodiment 2 of the present invention.

FIG. 6 is an operation timing chart of image display apparatus 100 according to the present embodiment, and corresponds to FIG. 4 of Embodiment 1. The same portions as in FIG. 4 will be assigned same reference numerals, and will not be explained. FIG. 6A shows a start timing and an end timing of light emission from each display line. FIG. 6B shows the open/closed state of the right-eye shutter at each timing. FIG. 6C shows the open/closed state of the left-eye shutter at each timing.

Assume that, as shown in FIG. 6A, at second time $t_2$ when period $S_c$ of shutter switching ends, writing of display data is finished up to line 810.

As shown by line 270, at second time $t_2$, image display apparatus 100 according to the present embodiment starts light emission from line 1 to line 810 in which writing display data is finished. Then, image display apparatus 100 starts light emission from the rest of line 811 to line 1080 as soon as writing display data is finished.

Further, image display apparatus 100 stops light emission from each display line such that, as shown by line 280, light emission from the last display line (i.e. line 1080) is stopped at fourth time $t_4$ when next shutter switching is started, in the same pattern as the pattern (i.e. line 270) in the time domain of the light emission start time. In the same way, image display apparatus 100 repeats image display in the state where periods of light emission from part of display lines are shifted.

In case where write-scan time $T_s$ is the same as in Embodiment 1, maximum durations $T_d$ of light emission of the left-eye image and the right-eye image per display line become equal, and the brightness is the same. The periods of light emission from line 811 to line 1080 are shifted from the periods of light emission from line 1 to line 810. By this means, the total number of display lines that are emitting light decreases in, for example, non-simultaneous light emission start period $T_{a1}$ in which line 811 to line 1080 are write-scanned and non-simultaneous light emission stop period $T_{a2}$ in which light emission from line 811 to line 1080 is stopped.

Accordingly, image display apparatus 100 according to the present embodiment can reduce power load compared to image display apparatus 100 according to Embodiment 1.

Here, the portions of the details of signal control for realizing the operation shown in FIG. 6 different from the details of signal control for realizing the operation shown in FIG. 4 of Embodiment 1 will be explained.

At second time $t_2$ when period $S_c$ of shutter switching ends, second gate driver 130 switches on light emission control signals simultaneously for display lines (here, line 1 to line 810) in which writing display data is finished at this point of time. Then, second gate driver 130 sequentially switches on light emission control signals for display lines (here, line 811 to line 1080) in which writing display data is not finished at second time $t_2$ as soon as writing display data is finished.

Then, second gate driver 130 sets in advance, for example, the time subtracting write-scan time $T_s$ from half of cycle f, as duration $T_d$ of light emission, and switches off light emission control signals at the time when duration $T_d$ of light emission passes from the time when light emission is started.

According to this signal control, image display apparatus 100 can shift periods of light emission from part of display lines.

Thus, according to the present embodiment, it is possible to reduce the period to light up all display lines simultaneously, prevent power load on image display apparatus 100 from concentrating, and reduce power consumption peaks. Note that it is possible to acquire this advantage from the operation shown in FIG. 5 of Embodiment 1.

Note that, although the timing to start light emission is preferably as soon as possible after the period of shutter switching ends, this timing does not always need to match with the end of the period of shutter switching. Further, although the timing to completely stop light emission from all display lines is preferably as late as possible before the period of shutter switching starts, this timing does not always need to match with the start of the period of shutter switching. Further, the display lines to start emitting light simultaneously are not limited to the above example.

Embodiment 3

Embodiment 3 of the present invention is an example where the display lines to shift periods of light emission are changed on a per frame basis.

First, visual images in a conventional image display apparatus and image display apparatus 100 according to Embodiment 2 when motion images of figures moving fast in the horizontal direction, will be explained.

Figure 7:
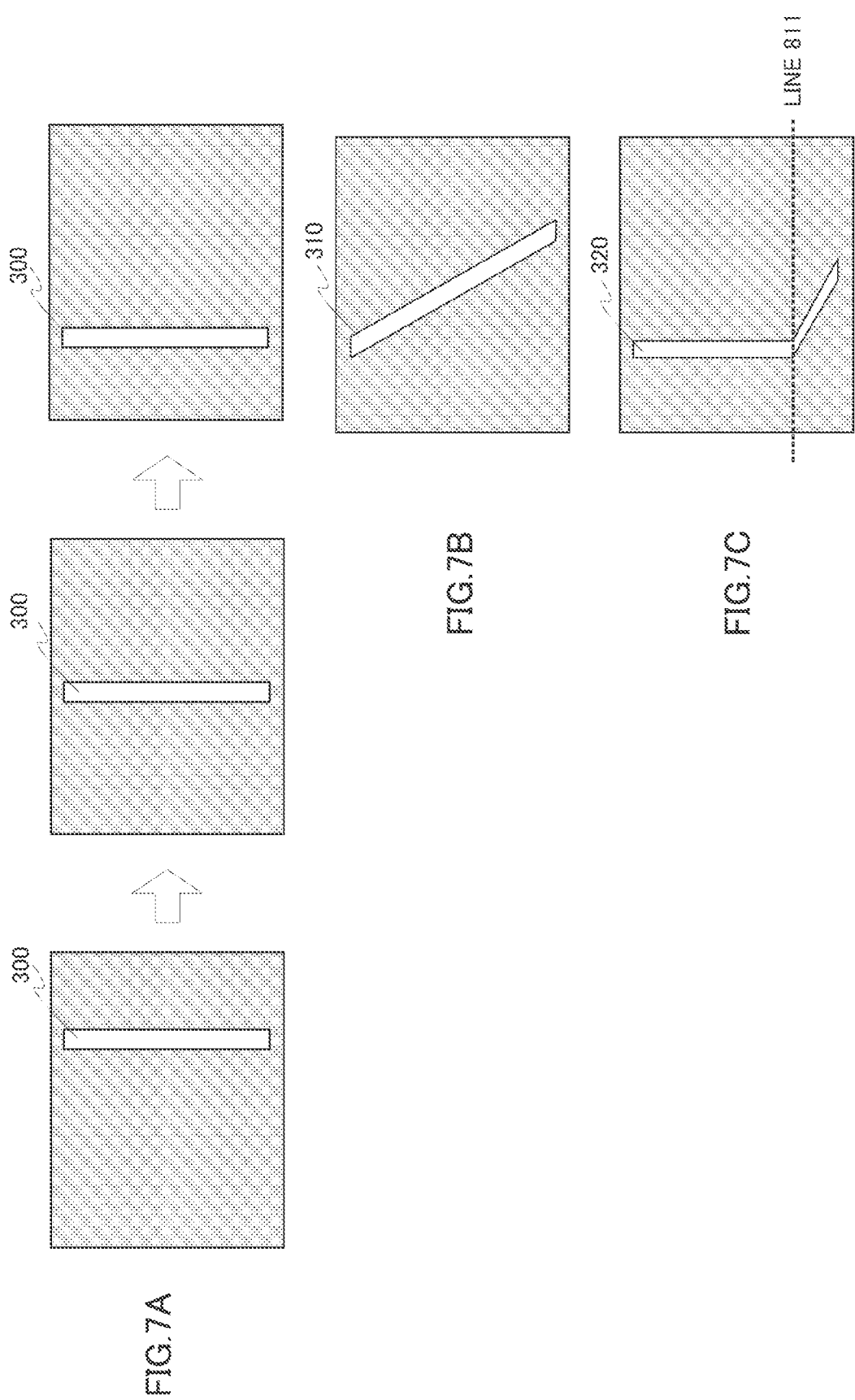
FIG. 7 illustrates states of visual images in a conventional image display apparatus and an image display apparatus according to Embodiment 2.

FIG. 7 illustrates the states of the visual images in the conventional image display apparatus and image display apparatus 100 according to Embodiment 2. FIG. 7A shows an input image. FIG. 7B shows a visual image matching the input image shown in FIG. 7A, in the image display apparatus of the conventional driving scheme. FIG. 7C shows a visual image matching the input image shown in FIG. 7A, in image display apparatus 100 according to Embodiment 2.

Here, as shown in FIG. 7A, a case will be explained where motion images of rectangular FIG. 300 moving fast from right to left on the screen are assumed as input images. Further, assume that display data is write-scanned from above to below as shown in FIG. 4 and FIG. 6.

A write-scan of each display line is delayed more toward the lower part of the screen. Therefore, as in the conventional image display apparatus, in case where light is emitted immediately after a write-scan is finished, image display is also delayed more toward the lower part of the screen. As a result, as shown in FIG. 7B, above FIG. 300 is seen as parallelogram FIG. 310.

As in Embodiment 1, in case where periods of light emission from all display lines match, this phenomenon does not occur and above FIG. 300 is viewed as original rectangular FIG. 300. However, as in Embodiment 2, in case where light emission from part of display lines is performed immediately after a write-scan is finished as in the conventional technique, FIG. 300 is viewed in these periods as a parallelogram figure as in FIG. 7B. Accordingly, when FIG. 7C is seen as a whole, FIG. 300 is viewed as FIG. 320 having the shape bent at the boundary (here line 811) between simultaneous light emission and sequential light emission. Then, compared to the conventional image display apparatus, there is a problem that it is difficult to have correspondence to the original figure, and it is likely to produce unnaturalness.

With the present embodiment, by changing the pattern of the light emission start timing in the time domain, this unnaturalness in a visual image is reduced.

Figure 8:
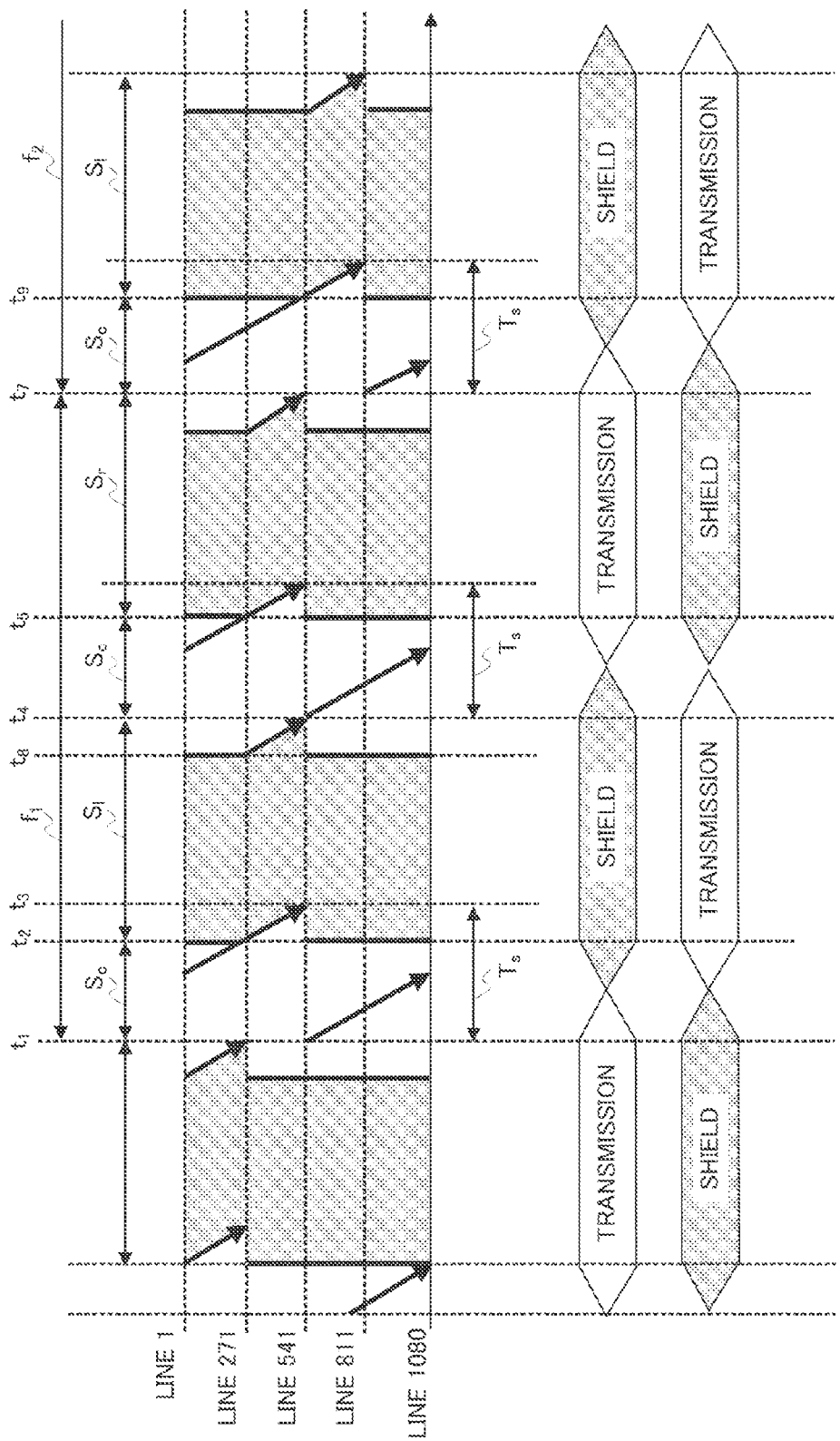
FIG. 8 is a first operation timing chart of an image display apparatus according to Embodiment 3 of the present invention.

FIG. 8 is an operation timing chart of image display apparatus 100 according to the present embodiment, and corresponds to FIG. 6 of Embodiment 2. The same portions as in FIG. 6 will be assigned the same reference numerals, and will not be explained. FIG. 8A shows the start timing and the end timing of light emission from each display line. FIG. 8B shows the open/closed state of the right-eye shutter at each timing. FIG. 8C shows the open/closed state of the left-eye shutter at each timing.

Note that, for ease of explanation, all display lines are adequately divided into line 1 to line 270 (hereinafter "line group 1"), line 271 to line 540 (hereinafter "line group 2"), line 541 to line 810 (hereinafter "line group 3") and line 811 to line 1080 (hereinafter "line group 4").

As shown in FIG. 8A, image display apparatus 100 performs a write-scan of display data in order of line group 3, line group 4, line group 1 and line group 2, in, for example, first frame cycle $f_1$ from first time $t_1$ and seventh time $t_7$. As a result, in last line group 2, periods of light emission are shifted in the same way as in line 811 to line 1080 of FIG. 6.

Next, image display apparatus 100 performs a write-scan of display data in order of line group 4, line group 1, line group 2 and line group 3 in, for example, next second frame cycle $f_2$ starting from seventh time $t_7$. As a result, in last line group 3, periods of light emission are shifted in the same way as in line 811 to line 1080 of FIG. 6.

Display lines to shift periods of light emission vary between first frame cycle $f_1$ and second frame cycle $f_2$. If the pattern of the light emission start timing in the time domain is changed per, for example, frame in this way, the boundary between simultaneous light emission and sequential light emission is not fixed. As a result, for example, for the input image shown in FIG. 7A, it is possible to have less unnatural visual images than in FIG. 7C.

Here, the portions of the details of signal control for realizing the operation shown in FIG. 8 different from Embodiment 2 will be explained.

Display panel control circuit 110 generates a start point line signal for specifying the display line of the start point to write display data, and inputs this signal to source driver 140, first gate driver 120 and second gate driver 130. Note that display panel control circuit 110 generates signal line signals such that the start point line varies between frames. Here, display panel control circuit 110 generates the start point line signal of first frame cycle $f_1$ for specifying line 541, and generates the start point line signal of second frame cycle $f_2$ for specifying line 811.

Source driver 140 has, for example, a frame memory, and temporarily stores at least display data of line 810. Then, source driver 140 retrieves display data sequentially from the frame memory, starting from the display line specified by the input start point line signal, and outputs the source signals.

First gate driver 120 controls a write signal received as input in each organic EL pixel circuit 190, starting from the display line specified by the input start point line signal based on the vertical synchronizing signal and the horizontal synchronizing signal.

Second gate driver 130 switches on light emission control signals for display lines in which writing display data is finished at the time when period $S_c$ of shutter switching ends, simultaneously based on the input start point line signal. Then, second gate driver 130 sequentially switches on light emission control signals for display lines in which writing display data is not finished at the time when period $S_c$ of shutter switching ends, as soon as possible after writing display data is finished. Then, second gate driver 130 switches off the light emission control signal per display line when duration $T_d$ of light emission passes from the time when light emission is started.

Here, second gate driver 130 switches on light emission control signals for display line groups 1, 3 and 4 at, for example, second time $t_2$ and fifth time $t_5$ when period $S_c$ of shutter switching of first frame cycle $f_1$ ends. Then, second gate driver 130 sequentially switches on light emission control signals for display line group 2 immediately after writing display data is finished. Further, second gate driver 130 switches on light emission control signals for display line groups 1, 2 and 4 at, for example, ninth time $t_9$ when period $S_c$ of shutter switching of second frame cycle $f_2$ ends. Then, second gate driver 130 sequentially switches on light emission control signals for display line group 3 immediately after writing display data is finished.

According to this signal control, image display apparatus 100 can change per frame the display lines to shift periods of light emission.

Thus, according to the present embodiment, display lines of shifted periods of light emission are changed per frame and driven, so that it is possible to reduce unnaturalness when motion images are displayed.

Figure 9:
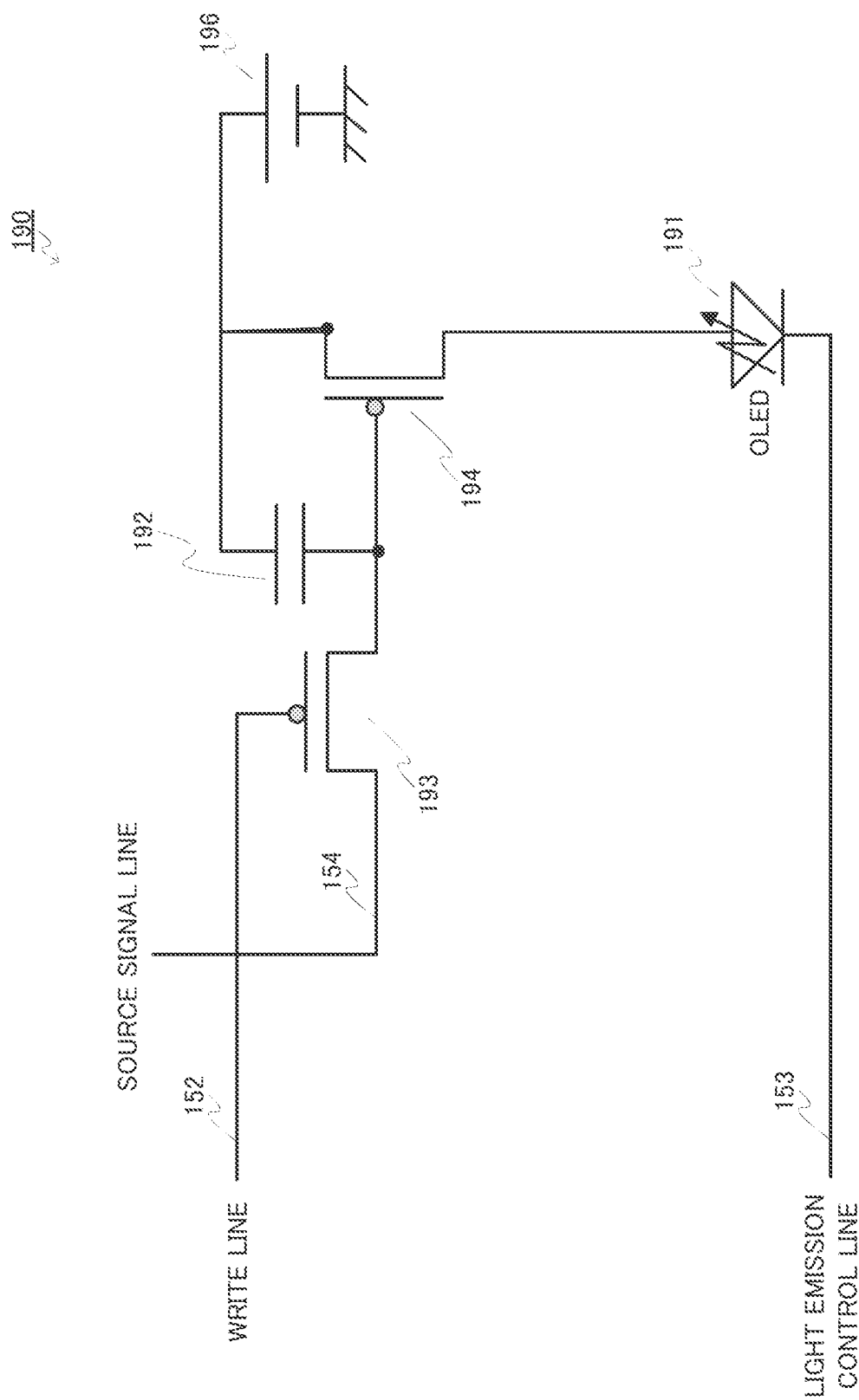
FIG. 9 is a circuit diagram showing another example of a configuration of an organic EL pixel circuit according to each embodiment.

Note that, although, with the above explained embodiments, organic EL pixel circuits 190 shown in FIG. 3 are used, the present invention is not limited to this, and, for example, organic EL pixel circuits shown in FIG. 9 may be used.

In FIG. 9, organic EL pixel circuit 190 does not have light emission control transistor 195 shown in FIG. 3. Further, in organic EL pixel circuit 190, light emission control line 153 is connected to the cathode side of organic EL element 191, and serves as a means for controlling the cathode voltage of organic EL element 191. According to this configuration, light emission control line 153 controls the cathode voltage of organic EL element 191, and performs the switching operation of driving of organic EL element 191. That is, it is possible to provide the advantage of the present invention without additionally providing light emission control transistor 195 shown in FIG. 3.

Further, although, with the above-explained embodiments, cases have been explained where right-eye images and left-eye images forming stereoscopic images are displayed alternately, the present invention is not limited to this. The present invention is also applicable to other image display apparatuses that repeat image display and non-image display alternately on a screen formed with a plurality of display lines.

For example, the present invention is applicable to an image display apparatus that displays different images for a plurality of users. In this case, the image display apparatus only needs to switch the shielding states of a plurality of shutter eyewears 170, in synchronization with switching of image display. By this means, a plurality of users wearing shutter eyewears 170 can individually select the details to view images or games using one display.

Further, although a case has been explained where an organic EL panel is used, the present invention is not limited to this. The present invention is applicable to, for example, image display apparatuses that can set a write-scan of and the time of light emission of display data, among various other image display apparatuses that use organic EL pixel elements and light emitting elements such as light emitting diodes.

The disclosure of Japanese Patent Application No. 2009-008885, filed on Jan. 19, 2009, including the specification, drawings and abstract, is incorporated herein by reference in its entirety.

INDUSTRIAL APPLICABILITY

The image display apparatus and the image display method according to the present invention are useful as an image display apparatus and an image display method that can make the total time of light emission longer per display line.

REFERENCE SIGNS LIST

100 IMAGE DISPLAY APPARATUS
110 DISPLAY PANEL CONTROL CIRCUIT
120 FIRST GATE DRIVER
130 SECOND GATE DRIVER
140 SOURCE DRIVER
150 DISPLAY PANEL
151 DISPLAY AREA
152 WRITE LINE
153 LIGHT EMISSION CONTROL LINE
154 SOURCE SIGNAL LINE
160 SHUTTER CONTROL CIRCUIT
170 SHUTTER EYEWEAR
190 ORGANIC EL PIXEL CIRCUIT
191 ORGANIC EL ELEMENT
192 MEMORY
193 DATA WRITE TRANSISTOR
194 GRADATION CONTROL TRANSISTOR
195 LIGHT EMISSION CONTROL TRANSISTOR
196 VOLTAGE SOURCE

The invention claimed is:

1. An image display apparatus that has a display panel and displays a stereoscopic image by means of repeating displaying images for a left eye and for a right eye alternately on the display panel, the display panel comprising a plurality of display lines, each of which comprise a plurality of organic EL elements, the display panel further comprising write lines and light emission control lines, the write lines and the light emission control lines being provided per the plurality of display lines, and the display panel showing the displayed images for the left eye and for the right eye through an eyewear which can shield views of the left and right eyes alternately, while a timing to switch a shielding state of the eyewear is controlled by a shield timing controlling section, the image display apparatus comprising:

a write-scanning section that sequentially writes display data of the images in the plurality of display lines in accordance with the timing to switch the shielding state of the eyewear, by driving the write line;

a light emitting section that allows the plurality of display lines to continue light emission, based on the written display data; and a light emission timing controlling section that controls, by driving the light emission control line, timings to start continuous light emission of the respective display lines without allowing the display lines to continue light emission in the period in which the shielding state of the eyewear is switched, wherein timings to drive the respective light emission control lines can be controlled independently from timings of writing the display data of the images in the respective display lines, and a time required for starting of continuous light emission from all of the plurality of display lines after at least one of the plurality of display lines starts continuous light emission is shorter than a time required for write-scanning of the display data in the plurality of display lines.

2. The image display apparatus according to claim 1, wherein the light emission timing controlling section controls all of the plurality of display lines to start light emission simultaneously.

3. The image display apparatus according to claim 1, wherein the light emission timing controlling section controls the plurality of display lines except predetermined display lines in the plurality of display lines, to emit light simultaneously, and delays light emission from the predetermined display lines.

4. The image display apparatus according to claim 3, wherein the light emission timing controlling section makes the predetermined display lines vary between frames of the stereoscopic image.

5. An image display method for an image display apparatus that has a display panel and displays a stereoscopic image by means of repeating displaying images for a left eye and for a right eye alternately on the display panel, the display panel comprising a plurality of display lines, each of which comprise a plurality of organic EL elements, the display panel further comprising write lines and light emission control lines, the write lines and the light emission control lines being provided per the plurality of display lines, and the display panel showing the displayed images for the left eye and for the right eye through an eyewear which can shield views of the left and right eyes alternately, while a timing to switch a shielding state of the eyewear is controlled, the image display method comprising:

sequentially starting writing display data of the images in the plurality of display lines in accordance with the timing to switch the shielding state of the eyewear, by driving the write line;

starting continuous light emission from the plurality of display lines, based on the written display data, without allowing the plurality of display lines to continue light emission in the period in which the shielding state of the eyewear is switched, by driving the light emission control line, wherein timings of the starting the continuous light emission by driving the respective light emission control lines can be controlled independently from timings of the sequentially starting writing the display data of the images in the plurality of the respective display lines, and a time required for starting of continuous light emission is shorter than a time required for write-scanning of the display data in the plurality of display lines.

* * * * *